United States Patent
Johnson et al.

(10) Patent No.: US 12,304,652 B2
(45) Date of Patent: May 20, 2025

(54) SYSTEM AND METHOD TO DETECT AUTHORIZED USER

(71) Applicant: Rockwell Collins, Inc., Cedar Rapids, IA (US)

(72) Inventors: Wade T. Johnson, Cedar Rapids, IA (US); Arjun Harsha Rao, Marion, IA (US); Timothy J. Wittkop, Marion, IA (US); Christopher L George, Winchester, VA (US); Michael P. Matessa, Ben Lomond, CA (US); Peggy Wu, Ellicott City, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 606 days.

(21) Appl. No.: 17/744,411

(22) Filed: May 13, 2022

(65) Prior Publication Data
US 2022/0388678 A1 Dec. 8, 2022

Related U.S. Application Data

(60) Provisional application No. 63/196,424, filed on Jun. 3, 2021.

(51) Int. Cl.
*B64D 45/00* (2006.01)
*B64C 25/50* (2006.01)
(Continued)

(52) U.S. Cl.
CPC .......... *B64D 45/0031* (2019.08); *B64C 25/50* (2013.01); *B64D 45/0053* (2019.08);
(Continued)

(58) Field of Classification Search
CPC ............ B64D 45/0031; B64D 45/0053; G06V 20/59; G06V 40/172; G06V 40/161; G06V 40/70; B64C 25/50
See application file for complete search history.

(56) References Cited

U.S. PATENT DOCUMENTS

| | | |
|---|---|---|
| 6,658,572 B1 | 12/2003 | Craig |
| 6,915,986 B2 | 7/2005 | D'Alvia |

(Continued)

FOREIGN PATENT DOCUMENTS

| | | |
|---|---|---|
| DE | 10149681 A1 | 4/2003 |
| EP | 2050671 A1 | 4/2009 |

(Continued)

OTHER PUBLICATIONS

Cockpit Door Are they Secure, https://an.aero/cockpit-door-are-they-secure/ (Year: 2022).*

(Continued)

*Primary Examiner* — Aryan E Weisenfeld
(74) *Attorney, Agent, or Firm* — Suiter Swantz IP

(57) ABSTRACT

A system is described. The system may detect whether a user within a flight deck is authorized to control the aircraft. The user may receive differing levels of authority to control the aircraft depending on whether the user is authorized or unauthorized. The system may also control the aircraft depending on the various phases of the aircraft, including in flight and on the ground. The system may also be used to unlock the controls for the aircraft. The system may unlock the control using biometric information or nonbiometric information. The system may include a camera which is added to a flight deck. The camera may capture images of users within the flight deck. Faces within the images may be detected and compared against authorized users for locking or unlocking the aircraft controls.

20 Claims, 6 Drawing Sheets

(51) Int. Cl.
*G06V 20/59* (2022.01)
*G06V 40/16* (2022.01)
*G06V 40/70* (2022.01)

(52) U.S. Cl.
CPC ............ *G06V 20/59* (2022.01); *G06V 40/161* (2022.01); *G06V 40/172* (2022.01); *G06V 40/70* (2022.01)

(56) References Cited

U.S. PATENT DOCUMENTS

| | | |
|---|---|---|
| 7,155,034 B1 | 12/2006 | Recce |
| 7,783,081 B2 | 8/2010 | Roques et al. |
| 9,878,803 B2 | 1/2018 | Frankenberger |
| 10,410,075 B2 | 9/2019 | Zebley et al. |
| 10,733,858 B2 | 8/2020 | Gerard |
| 2003/0071743 A1 | 4/2003 | Seah et al. |
| 2004/0145498 A1 | 7/2004 | Carroll |
| 2006/0025900 A1 | 2/2006 | Arnouse |
| 2007/0075876 A1 | 4/2007 | Zelenkov |
| 2016/0027336 A1 | 1/2016 | Towers et al. |
| 2020/0238952 A1 | 7/2020 | Lindsay et al. |
| 2021/0034053 A1 | 2/2021 | Nikolic et al. |

FOREIGN PATENT DOCUMENTS

| | | |
|---|---|---|
| EP | 3121121 A1 | 1/2017 |
| WO | 03045782 A1 | 6/2003 |

OTHER PUBLICATIONS

Extended Search Report in European Application No. 22176799.9 dated Oct. 31, 2022, 9 pages.

\* cited by examiner

102

SYSTEM AND METHOD TO DETECT AUTHORIZED USER

CROSS-REFERENCE TO RELATED APPLICATIONS

The present application claims the benefit under 35 U.S.C. Section 119(e) of U.S. Provisional Application No. 63/196,424, filed Jun. 3, 2021, which is incorporated herein by reference in the entirety.

TECHNICAL FIELD

The present disclosure generally relates to methods and systems for alarms and more particularly to alarms responsive to undesired or abnormal pilot state.

BACKGROUND

With events like 9/11, security in the cockpit has become extremely important. Having an unauthorized user in the cockpit can cause extreme harm not just to those on the aircraft, but to the greater society in general. Therefore, it would be advantageous to provide a device, system, and method that cures the shortcomings described above.

SUMMARY

A system is described, in accordance with one or more embodiments of the present disclosure. In one illustrative embodiment, the system includes a camera configured to capture an image within a flight deck of an aircraft. In another illustrative embodiment, the system includes a non-transitory memory maintaining program instructions and one or more authorized faces. In another illustrative embodiment, the system includes one or more processors configured to execute the program instructions maintained on the memory. In another illustrative embodiment, the program instructions cause the one or more processors to receive the image from the camera. In another illustrative embodiment, the program instructions cause the one or more processors to determine a detected face within the image is unauthorized, thereby indicating an unauthorized user is disposed within the flight deck. In another illustrative embodiment, the one or more processors detects the detected face by a facial detection algorithm. In another illustrative embodiment, the one or more processors determines the detected face within the image is unauthorized by comparing the detected face with the one or more authorized faces. In another illustrative embodiment, the program instructions cause the one or more processors to change a mode of the aircraft from a full authority mode to a reduced authority mode in response to determining the detected face within the image is unauthorized. In another illustrative embodiment, the unauthorized user has full authority to control one or more user interface elements of the aircraft in the full authority mode. In another illustrative embodiment, the unauthorized user has reduced authority to control the one or more user interface elements of the aircraft in the reduced authority mode.

A method is described, in accordance with one or more illustrative embodiments. In one illustrative embodiment, the method includes receiving an image from a camera. In another illustrative embodiment, the camera captures the image within a flight deck of an aircraft. In another illustrative embodiment, the method includes determining, by one or more processors, a detected face within the image is unauthorized, thereby indicating an unauthorized user is disposed within the flight deck. In another illustrative embodiment, the one or more processors detects the detected face by a facial detection algorithm. In another illustrative embodiment, the one or more processors determines the detected face within the image is unauthorized by comparing the detected face with one or more authorized faces maintained in a non-transitory memory. In another illustrative embodiment, the method includes changing a mode of the aircraft from a full authority mode to a reduced authority mode in response to determining the detected face within the image is unauthorized. In another illustrative embodiment, the unauthorized user has full authority to control one or more user interface elements of the aircraft in the full authority mode. In another illustrative embodiment, the unauthorized user has reduced authority to control the one or more user interface elements of the aircraft in the reduced authority mode.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
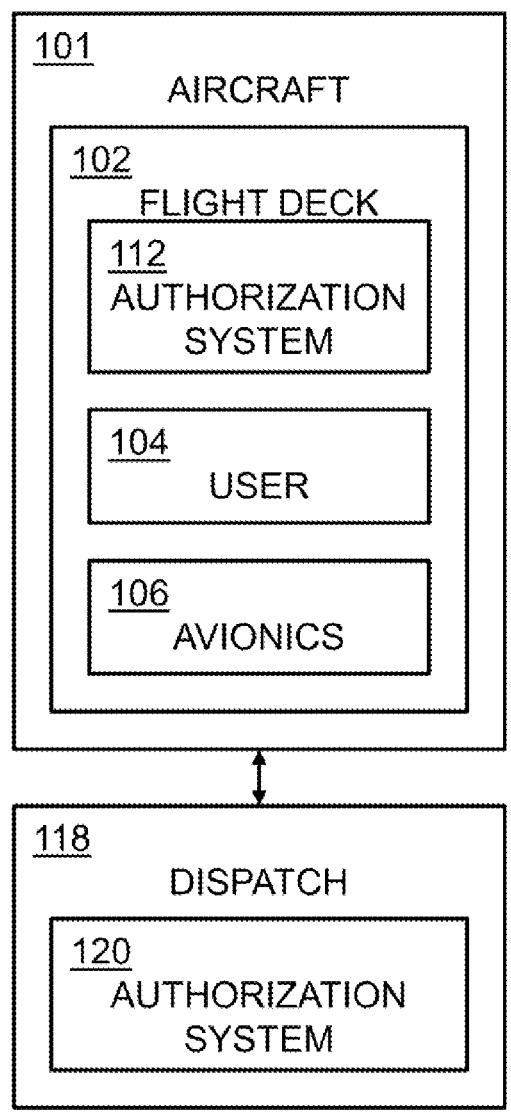
FIG. 1A illustrates a simplified block diagram of a system, in accordance with one or more embodiments of the disclosure.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Embodiments of the present disclosure are directed to a system and method to detect an authorized user. The system may include non-intrusive detection devices (e.g., cameras, fingerprint scanners, keypads, or the like) to detect a user and uniquely identify them. If an un-authorized user is present, the system may be configured to lock down and prevent access. In addition, a ground system of the system may be configured to unlock the cockpit in an emergency situation where a user becomes incapacitated.

Figure 1B:
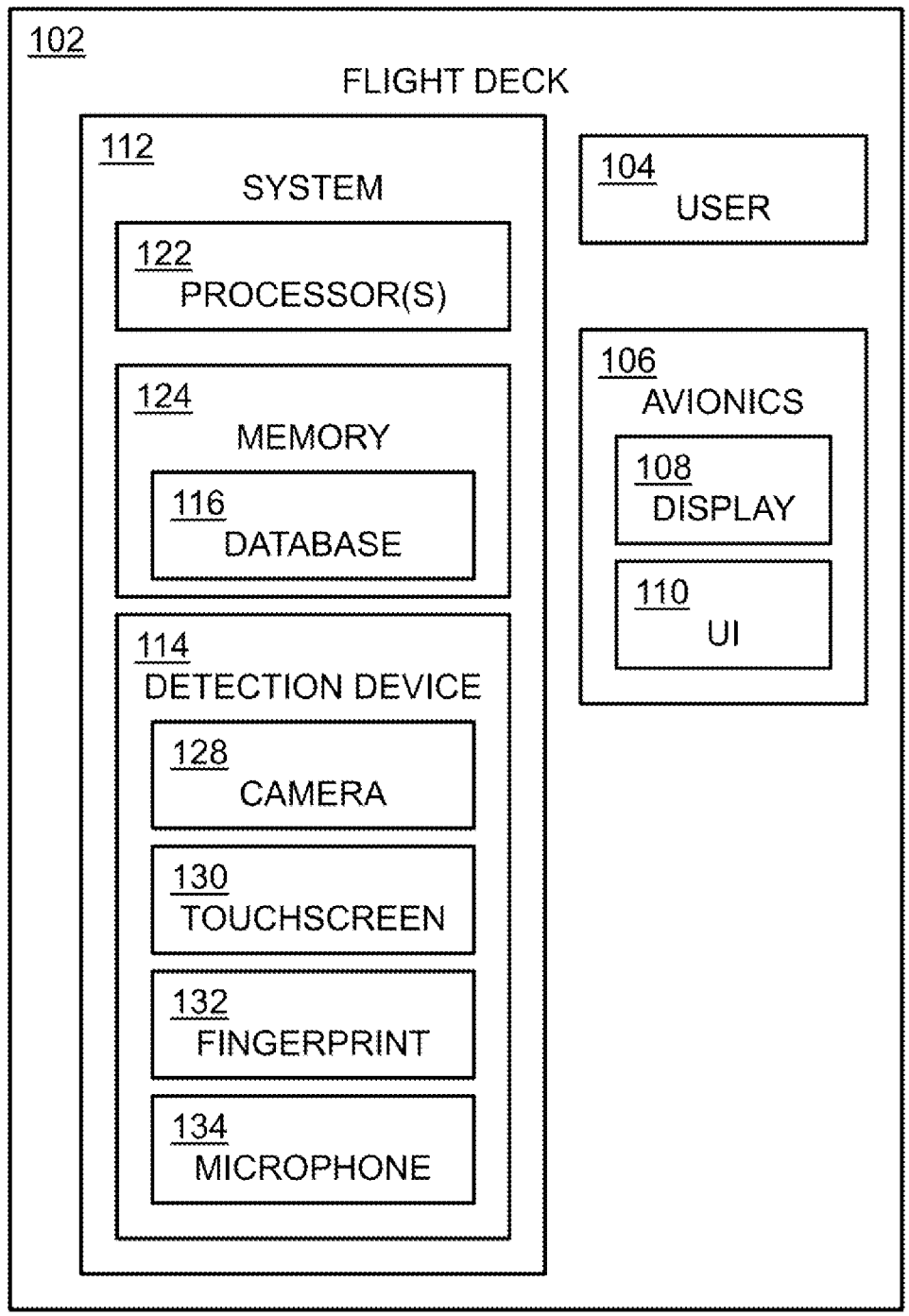
FIG. 1B illustrates a simplified block diagram of a flight deck of an aircraft, in accordance with one or more embodiments of the disclosure.
Figure 1C:
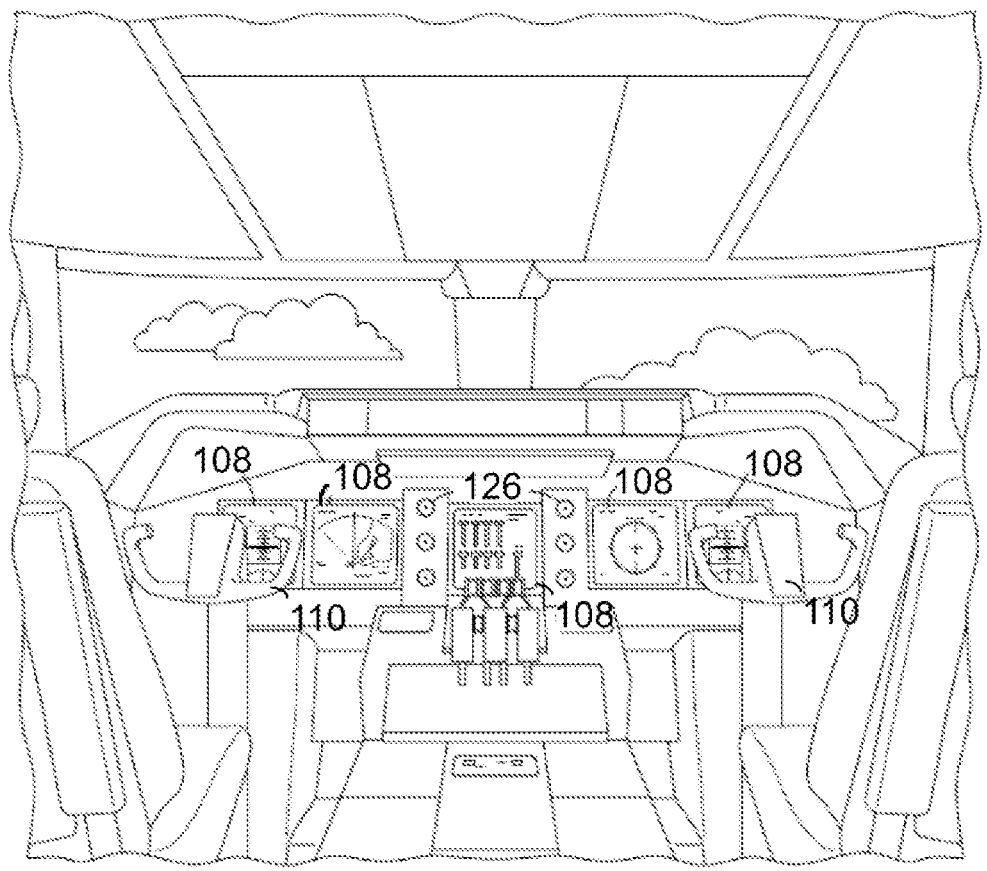
FIG. 1C illustrates a perspective view of a flight deck of an aircraft, in accordance with one or more embodiments of the disclosure.

Referring generally to FIGS. 1A-1C a system 100 to detect an authorized user, in accordance with one or more embodiments of the disclosure. The system 100 may include one or more of an aircraft 101 and a ground dispatch 118. The aircraft 101 may include an aircraft flight deck 102. The aircraft flight deck 102 may be configured for a user 104 (e.g., an aircraft operator or other user) to interact with avionics systems 106 of an airborne platform. In embodiments, the aircraft flight deck 102 includes a user authentication system 112. The user authentication system 112 may be configured to detect an authorized/unauthorized user within the aircraft flight deck 102. The user authentication system 112 may be further configured to enable/disable control of the aircraft when an authorized/unauthorized user is detected. For example, the user authentication system 112 may adjust a mode of the aircraft 101 (e.g., by the avionics 106).

The system 100 may be further integrated with ground dispatch 118. The ground dispatch 118 may be communicatively coupled to the aircraft flight deck 102, and vice versa. The ground dispatch 118 may include a user authorization monitoring sub-system 120. For example, the user authorization monitoring sub-system 120 may be communicatively coupled to the user authorization sub-system 112. In one instance, the user authorization sub-system 112 may be configured to provide one or more signals to the user authorization monitoring sub-system 120, where the one or more signals include authorization data to indicate whether or not the user 104 is authorized/unauthorized. In this regard, when an unauthorized user is detected, the monitoring sub-system 120 may be configured to disable the avionics 106 and when an authorized user is detected, the monitoring sub-system 120 may be configure to enable to avionics 106. In another instance, the user monitoring sub-system 120 may be configured to provide one or more signals to the user authorization sub-system 112 to authorize a user 104. In this regard, the ground dispatch 118 may be configured to authorize a user 104 without the use of the one or more detection devices 114 (e.g., when a user is not in a database 116, when an emergency situation occurs, or the like). Although the system 100 is described as including the ground dispatch 118, this is not intended to be limiting. In embodiments, the user authorization system 112 is configured to authorize the user 104 without communicating with the ground dispatch 118.

Referring now to FIG. 1B, one or more components of the flight deck 102 are further described.

The avionics 106 may include one or more flight displays 108 and one or more user interface ("Ur") elements 110. It is noted that the avionics 106 may include any type of display 108 known in the art including, but not limited to, cathode ray tube (CRT) display, liquid crystal display (LCD), organic light-emitting diode (OLED), dot matrix display, and the like.

The flight displays 108 may be configured to provide information to the user 104 to increase visual range and enhance decision-making abilities. For example, one or more of the flight displays 108 may be configured to function as a primary flight display (PFD) used to display altitude, airspeed, vertical speed, and navigation and traffic collision avoidance system (TCAS) advisories. By way of another example, one or more of the flight displays 108 may also be configured to function as a multi-function display used to display navigation maps, weather radar, electronic charts, TCAS traffic, aircraft maintenance data and electronic checklists, manuals, and procedures. By way of another example, one or more of the flight displays 108 may also be configured to function as an engine indicating and crew-alerting system (EICAS) display used to display critical engine and system status data.

The user interface elements 110 may include, but are not limited to, a keyboard, a joystick, a mouse, a touchscreen display, a button, a switch, or the like. The user interface elements 110 may be used for controlling aircraft 101, such as, but not limited to, rudder pedals, throttle control, trim, and the like. Other types and functions of the user interface elements 110 are contemplated and will be apparent to those skilled in the art. In some instances, the user interface elements 110 provide fly-by-wire commands to various control surfaces (e.g., elevators, flaps, aileron, etc.) of the aircraft 101. In embodiments, the system 112 is used to provide commands to adjust a mode of the aircraft 101, thereby limiting or preventing the ability of the user interface elements 110 to transmit control signals to the control surfaces.

The user authorization sub-system 112 may include one or more detection devices 114. The detection devices 114 may also be referred to herein as input devices. The detection devices 114 may receive various input from the user 104 within the flight deck 102. The input may then be provided to the processors 122 for detection whether the user 104 is authorized or unauthorized and controlling the avionics 106 appropriately. The one or more detection devices 114 may provide various inputs of detection data to the processor 122. The processor 122 may then compare detection data with a database 116 stored in the memory 124. By comparing the detection data to the database 116, the processor may determine whether the user 104 is an unauthorized user or an authorized user. For example, if the detection data is not found in the database 116 then the user may be deemed an unauthorized user. By way of another example, if the detection data is found in the database 116 then the user may be deemed an authorized user. The detection device may include, but is not limited to, a camera 128, a touchscreen 130, a fingerprint scanner 132, a microphone, a badge reader, and the like.

For example, the one or more detection devices 114 may include a camera 128 configured to capture a stream of images. The stream of images may then be provided to the processor 122 for detecting a face and comparing the face with a list of authorized faces of authorized users to determine whether the user 104 is authorized or unauthorized. The processors 122 may thus be configured with facial recognition capabilities or facial detection by which the processors detect a detected face in an image. It is noted that the camera 128 and/or processors 122 may use any type of facial detection algorithms known in the art.

By way of another example, the one or more detection devices 114 may include a touchscreen 130. The user 104 may input one or more of a password, a pin code, and the like by the touchscreen. The password or pin code may be provided to the processors 122. The processors 122 may then compare the input prestored passwords and pin codes. The prestored passwords and pin codes may be associated with authorized users and/or duress signals. For instance, the pin code may be a unique, predetermined unlock code. It is noted that the predetermined unlock code may be any length alphanumeric code or non-alphanumeric code. By way of another instance, the pin code may be a duress signal which adjusts a mode of the aircraft to prevent unauthorized users from using the user interface element 110 (e.g., input a 911 code). Although the touchscreen 130 is depicted as being one of the input devices 114 of the system 112, this is not intended as a limitation. The touchscreen 130 may also be one of the user interface elements 110 of the avionics 106. For example, the touchscreen 130 may include, but is not limited to, a primary flight display or a multi-function display of the aircraft 100, which may also be considered part of the display 108 of the avionics 106.

By way of another example, the one or more detection devices 114 may include a fingerprint scanner 132. The fingerprint scanner 132 may capture a fingerprint of the user 104 and provide the captured fingerprint to the processors 122. The processors 122 may then compare the captured fingerprint to a database of fingerprints of authorized users. If the fingerprint is a match, the processors 122 may authorize the user 104.

By way of another example, the one or more detection devices 114 may include a microphone 134. The microphone 134 may capture an audio recording of a voice of the user 104. The audio recording may then be provided to the processors 122. In embodiments, the processors 122 are configured to perform voice recognition or speaker recognition on the audio recording to identify who is speaking and determine whether the voice is associated with one or more authorized users stored in a database. In embodiments, the processors 122 are configured to perform speech recognition on the audio recording to identify words or phrases spoken by the user 104 and compare the words or phrases with various words or phrases stored in memory. For instance, the memory may include a word or phrase associated with an authorized user which is used to authorize the user 104. By way of another instance, the memory may include a word or phrase associated with a duress which is used to indicate the user 104 is in duress and further limits the users 104 ability to control the aircraft 101. In embodiments, the speech recognition may be imprinted when on ground when getting ready to take-off, thereby allowing the system to recognize user as authorized user. In some instances, the camera 128 and the microphone 134 may be housed in common housing.

It is noted that the one or more detection devices 114 may be located anywhere within the aircraft cabin (e.g., cockpit, outside of the cockpit, or the like). Further, it is noted that the one or more detection devices 114 may be located anywhere outside of the aircraft cabin. Therefore, the above description should not be construed as limiting the scope of the present disclosure.

The database 116 may contains biometric information and non-biometric information associated with authorized users which is used to authorize the user 104 and unlock the aircraft 101. The information may provide two types of the authentication. For example, the biometric information may include facial features, eyes, fingerprints, voice recognition, and the like. By way of another example, the nonbiometric information may include badge identification, passphrase, pin code, speech utterance, and the like. The database may also contain information associated with duress. For example, the duress inputs may include a pin code, a speech utterance, and the like.

In embodiments, the database 116 may be stored in a remote database. For example, the remote database 116 may include one or more images of one or more authorized users. In this regard, if the image captured by the camera matches an image within the database 116, then the user may be deemed an authorized user. However, if the image captured by the camera does not match an image within the database 116, then the user may be deemed an unauthorized user. By way of another example, the remote database 116 may include one or more fingerprint scans of one or more authorized users. In this regard, if the fingerprint scan captured by the fingerprint scanner matches a fingerprint within the database 116, then the user may be deemed an authorized user. However, if the fingerprint scan captured by the fingerprint scanner does not match a fingerprint within the database 116, then the user may be deemed an unauthorized user. By way of another example, the remote database 116 may store the predetermined unlock code for the keypad. In this regard, if the entered code matches the stored unlock code, then the user may be deemed an authorized user. However, if the entered code does not match the stored unlock code, then the user may be deemed an unauthorized user.

The database 116 may be formed using any data collection method. For example, information from aircrew employee badges may be stored in the database 116. For instance, the aircrew employee's ID badge image may be stored in the database 116. In this regard, the aircrew employee may scan their ID badge at the gate and when in the cockpit, the user may be authorized by performing facial recognition using the camera, where the camera compares the ID badge image and the captured image from the camera. By way of another example, the database 116 may be formed by pre-loading authorization data onto the database 116 (e.g., loading images of authorized users, loading fingerprints of authorized uses, loading predetermined unlock codes, or the like).

The system 112 may further include one or more processors 122. The processors 122 may include any processing unit known in the art. For example, the processing unit may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from a memory, from firmware, or by hardware implemented functions. It should be recognized that the steps described throughout the present disclosure, such as, but not limited to, the method described herein, may be carried out by the processors 122.

The system 112 may include a memory 124. The memory 124 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in an integrated modular avionics (IMA) controller, or the like. In an alternative embodiment, the memory 124 may be located remotely with respect to the physical location of the processor 122. In another embodiment, the memory maintains program instructions for causing the processor(s) to carry out the various steps described through the present disclosure. The memory 124 may also maintain a database 116 for authorizing the user 104 and/or for changing a mode of the aircraft 101.

Referring now in particular to FIG. 1C, an exemplary embodiment of the flight deck 102 is described. The number and arrangement of the various elements within the flight deck 102 may be based on the type of the aircraft 101. Thus, the configuration of FIG. 1C is not intended to be limiting but is merely provided for exemplary purposes.

The flight deck 102 may include one or more the displays 108. The displays 108 may be implemented using any of a variety of display technologies, including CRT, LCD, organic LED, dot matrix display, and others. The displays 108 may be configured to function to display various information known in the art. The displays 108 may be configured to function as one or more of a primary flight display (PFD) or a multi-function display (MFD). Such PFD and MFDs may be mounted in front of both a pilot and a copilot. The MFD may be mounted between the PFD of the pilot and the PFD of the copilot. Thus, the displays 108 may provide instrumentation for the operation of an aircraft. Other types and functions of the displays 108 are contemplated and will be apparent to those skilled in the art.

The flight deck 102 may also include one or more aircraft instruments 126. The aircraft instruments 126 may include, but are not limited to, left, center, right, overhead, second officer, or other aircraft instruments. The aircraft instruments 126 may be implemented using any of a variety of technologies, including CRT, LCD, organic LED, dot matrix display, and others. The aircraft instruments 126 may indicate information associated with various flight instruments of the aircraft, such as, but not limited to, attitude, heading, vertical speed, air speed, altimeter, or turn. Other types and functions of the aircraft instruments 126 are contemplated and will be apparent to those skilled in the art.

The flight deck 102 may also include one or more of the user interface elements 110. As depicted, the user interface elements 110 may be control yoke. A user sitting in the seat may utilize the control yoke to control the attitude, pitch, or roll of the aircraft 101.

Figure 2:
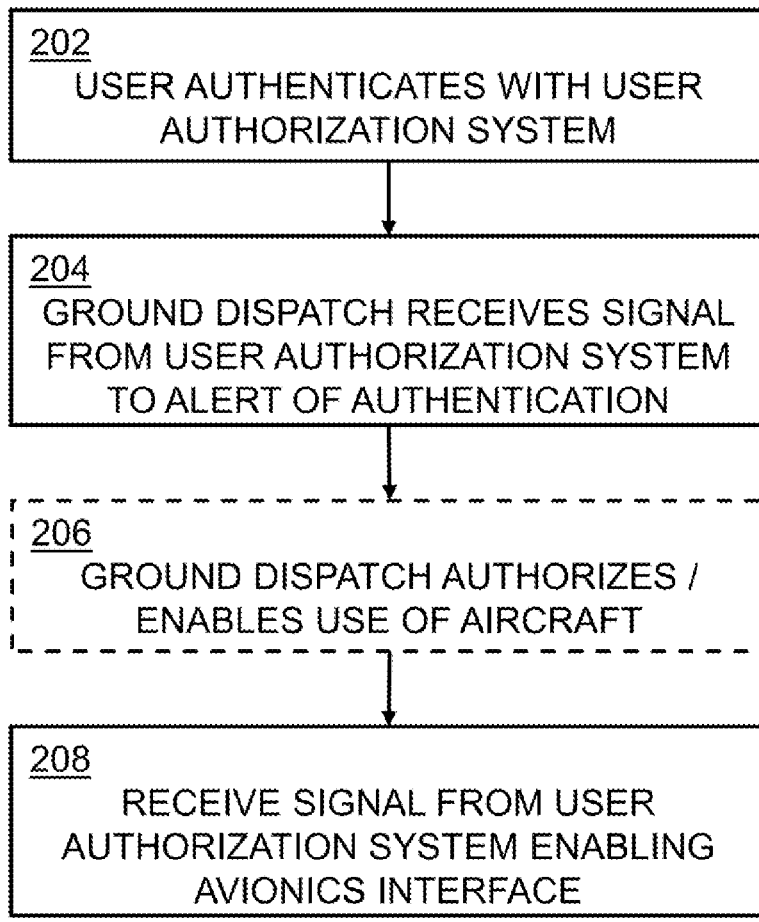
FIG. 2 illustrates a flowchart depicting a method or process for detecting an authorized user, in accordance with one or more embodiments of the disclosure.

FIG. 2 illustrates a flowchart depicting a method 200 or process for detecting an authorized user, in accordance with one or more embodiments of the present disclosure. The embodiments and the enabling technology described previously herein in the context of the system 100 should be interpreted to extend to the method 200. It is further contemplated that the method 200 is not limited to the system 100.

In a step 202, the user authenticates with the user authorization sub-system. For example, the user 104 may authenticate with the user authorization sub-system 112 using one of the one or more detection devices 114. In one instance, the user 104 may authenticate using facial recognition via the camera. In this regard, the user authorization sub-system 112 may be configured to compare the user's face with the database 116 and determine whether the user is authorized (e.g., the user's face is an authorized user within the database 116). In another instance, the user 104 may authenticate using fingerprint scanning via a fingerprint scanner. In this regard, the user authorization sub-system 112 may be configured to compare the user's fingerprint with the database 116 and determine whether the user is authorized (e.g., the user's fingerprint is an authorized user within the database 116). In another instance, the user 104 may authenticate using a predetermined code via the keypad device. In this regard, the user authorization sub-system 112 may be configured to compare the entered code and the predetermined code and determine whether the user is authorized (e.g., whether the codes match).

By way of another example, the user 104 may authenticate with the user authorization sub-system 112 when the user monitoring sub-system 120 provides the authorization sub-system 112 with an authorization signal. In this regard, the ground dispatch 118 may be configured to authorize the user 104 remotely.

In a step 204, the ground dispatch is alerted of the authentication. For example, the ground dispatch 118 may be configured to receive one or more signals from the user authentication sub-system 112 to alert the ground dispatch 118 of the authentication.

In an optional step 206, the ground dispatch may authorize/enable use of the aircraft. For example, the ground dispatch 118 may provide one or more signals to the aircraft flight deck 102 to authorize/enable use of the aircraft. In this regard, the ground dispatch 118 may control the use of the aircraft (e.g., avionics) and when a user 104 wants to access the avionics, the user 104 may request control from the ground dispatch 118. It is noted that this allows the ground dispatch 118 to have tighter control as to who uses the aircraft and when they are able to use it. For example, maintenance personnel could only access the avionics during their shift.

In a step 208, a signal is received from the user authorization sub-system to enable avionics interface for the user. For example, the user authorization sub-system 112 may provide one or more signals to the avionics 106 to enable the interface for the user 104. In this regard, the information on the displays is visible and user inputs may be accepted from the system. However, if the system is "locked", then no user input would be accepted by the system. For example, the flight plan could not be changed. By way of another example, the flight controls would not respond to inputs.

Figure 3:
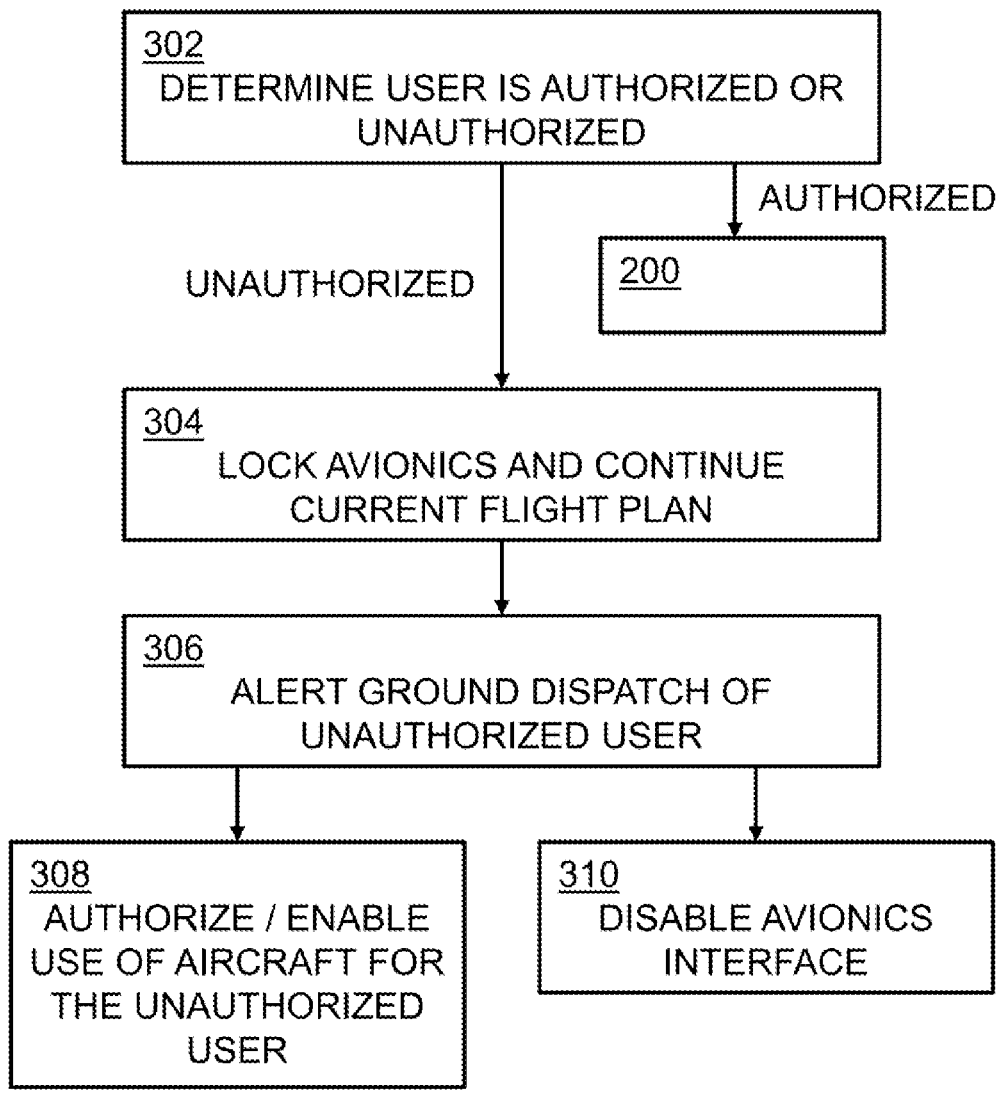
FIG. 3 illustrates a flowchart depicting a method or process for detecting an authorized user, in accordance with one or more embodiments of the disclosure.

FIG. 3 illustrates a flowchart depicting a method 300 or process for detecting an authorized user, in accordance with one or more embodiments of the present disclosure. The embodiments and the enabling technology described previously herein in the context of the system 100 should be interpreted to extend to the method 300. It is further contemplated that the method 300 is not limited to the system 100.

In a step 302, the user authorization sub-system determines whether the user is authorized or unauthorized. For example, the user authorization sub-system 112 may determine whether the user is authorized or unauthorized using one of the one or more detection devices 114. The user 104 may authenticate with the user authorization sub-system 112 using one of the one or more detection devices 114. For example, the user 104 may authenticate using facial recognition via the camera. In this regard, the user authorization sub-system 112 may be configured to compare the user's face with the database 116 and determine whether the user is authorized (e.g., the user's face is an authorized user within the database 116). By way of another example, the user 104 may authenticate using fingerprint scanning via a fingerprint scanner. In this regard, the user authorization sub-system 112 may be configured to compare the user's fingerprint with the database 116 and determine whether the user is authorized (e.g., the user's fingerprint is an authorized user within the database 116). By way of another example, the user 104 may authenticate using a predetermined code via the keypad device. In this regard, the user authorization sub-system 112 may be configured to compare the entered code and the predetermined code and determine whether the user is authorized (e.g., whether the codes match).

In a step 304, if the user is unauthorized, the system locks avionics and continues current flight plan. For example, the information on the displays is visible and user inputs may be rejected by the system. For instance, the flight plan may not be changed. By way of another example, the flight controls may not respond to inputs.

In a step 306, if the user is unauthorized, the ground dispatch may be alerted of the unauthorized user. For example, the user authorization sub-system 112 may be configured to provide one or more signals to the ground dispatch 118 via the monitoring sub-system 120, where the signals indicate that the user 104 is un-authorized.

In an optional step 308, if the user is unauthorized, the ground dispatch may authorize/enable use of the aircraft to unrecognized user. For example, the user 104 may authenticate with the user authorization sub-system 112 when the user monitoring sub-system 120 provides the authorization sub-system 112 with an authorization signal. In this regard, the ground dispatch 118 may be configured to authorize the user 104 remotely.

In an optional step 310, if the user is unauthorized, the avionics may be disabled for the unauthorized user. For example, the authorized sub-system 112 may provide one or more signals to the avionics 106 to disable the interface for the unauthorized user to prevent the unauthorized user from controlling the aircraft.

If the user is authorized, steps 204-208 may be followed.

In a step 204, the ground dispatch is alerted of the authentication. For example, the ground dispatch 118 may be configured to receive one or more signals from the user authentication sub-system 112 to alert the ground dispatch 118 of the authentication.

In an optional step 206, the ground dispatch may authorize/enable use of the aircraft. For example, the ground dispatch 118 may provide one or more signals to the aircraft flight deck 102 to authorize/enable use of the aircraft.

In a step 208, a signal is received from the user authorization sub-system to enable avionics interface for user. For example, the user authorization sub-system 112 may provide one or more signals to the avionics 106 to enable the interface for the user 104.

Figure 4:
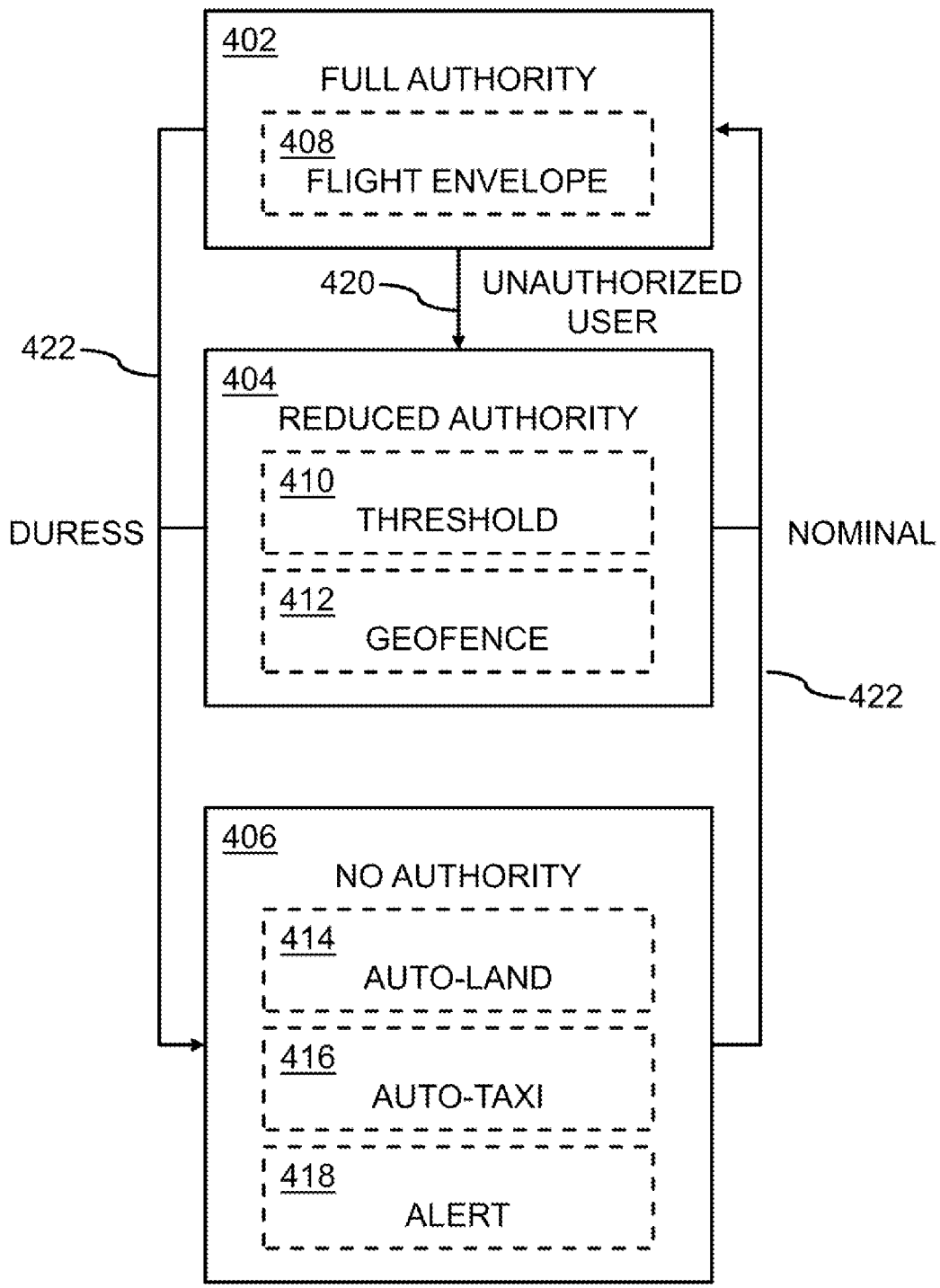
FIG. 4 illustrates a flowchart depicting a method or process for adjusting a mode of an aircraft, in accordance with one or more embodiments of the disclosure.

Referring now to FIG. 4, a flow diagram for one or more modes of the aircraft 101 are described, in accordance with one or more embodiments of the present disclosure. In embodiments, the system 112 is configured to adjust a mode of the aircraft 101 between one or more of a full authority mode 402, a reduced authority mode 404, and a no authority mode 406.

The full authority mode 402 may include allowing the user 104 to control the user interface elements 110 of the flight deck 102 with full authority. For example, the user 104 may control the user interface elements 110 of the flight deck 102 thereby adjusting the flight envelope 408 (e.g., pitch, yaw, thrust, etc.). In some instances, the user 104 may even adjust the flight envelope 408 beyond what would normally be considered an acceptable range by an autopilot system. The ability to control the flight envelope 408 outside of the normally acceptable ranges may be essential during non-standard flight scenarios, which may be difficult or impossible to prepare an autopilot maneuver a priori.

The reduced authority mode 404 may include increasing the flight rules or otherwise reducing an authority of the user 104 to control the user interface elements 110 of the flight deck 102. For example, in the reduced authority mode 404 not all authority is taken away from the user 104. However, the reduced authority mode 404 may include placing one or more thresholds 410 on the user interface elements 110. In this regard, the threshold may limit a rate-of-climb, a rate-of-descent, a pitch angle, a roll angle, a yaw angle, a thrust, attitude, bank angle, and the like. The ability to not take away all authority but limit the climb/descent, control exclusion zones, and control the flight path may improve a safety of the aircraft. Thus, the reduced authority mode 404 does not totally lock the user from controlling the flight surfaces, but rather restrict or limits the ability to control the aircraft.

The reduced authority mode 404 may also include geofencing 412 the aircraft 101. The geofencing may include engaging an aircraft autopilot to ensure that the aircraft 101 remains within a prescribed geographic boundary or outside of a prescribed geographic boundary (e.g., an exclusion zone). For example, the aircraft 101 may be caused to follow a flight path and remain within a prescribed geographic boundary around the flight plan. In this regard, the user may be prevented from moving the aircraft outside of the preset flight path in the reduced authority mode. By way of another example, the aircraft 101 may be caused to remain outside of a no-fly zone such as near a populous city, or the like.

The no authority mode 406 may include engaging any number of safety systems of the aircraft 101 for preventing a crash event. In the no authority mode 406 users of the aircraft may be locked out from sending commands to the control surfaces. In a first instance, the no authority mode 406 includes engaging an autopilot and preventing the user 104 from the input commands from the user interface elements 110 to control the control surfaces of the aircraft 101. One or more flight control systems of the aircraft are thus disengaged in the no authority mode to lock out and prevent the unauthorized user from controlling the aircraft.

The no authority mode 406 may include engaging an auto-land function 414. The auto-land function 414 may determine a nearest airport and engage the control surfaces to path towards and land at the nearest airport. The auto-land function 414 may thus put the aircraft 101 on a path or trajectory which brings into land in a nearest airport. The trajectory may further govern how much the user is authorized to bank. The auto-land function may also be referred to as an emergency descent and landing system. After an unauthorized user is detected and/or a duress phrase is uttered, the emergency descent and landing system may compute how to bring an aircraft into safe landing.

The no authority mode 406 may also include an auto-taxi function 416. For example, the aircraft 101 may be disposed on the ground. The auto-taxi function 416 may be engaged to automatically taxi the aircraft back to a nearest gate.

The no authority mode 406 may also include an alerting function 418. The alerting function 418 may signal to one or more authorities that the user 104 is in duress. For example, the alerting function 418 may provide the signal to an air marshal onboard the aircraft 101. By way of another example, the alerting function 418 may provide the signal to the ground dispatch 118. In some instances, an alert may be provided on the display within the flight deck in response to the no authority mode or the reduced authority mode.

In a step 420 the aircraft may be in full authority mode 402. The system 112 may detect an unauthorized user is in the flight deck 102. The system 112 may detect the authorized user is in the flight deck 102 by any of the techniques described previously herein, such as, but not limited to, facial detection. The processors may then be configured to reduce the mode of the aircraft from the full authority mode 402 to the reduced authority mode. In this regard, the pilot may still have some authority to issue flight commands, and may not even notice the limited authority. However, the reduced authority mode 404 may be beneficial in preventing the authorized user from overpowering the pilot and issuing flight commands outside of the threshold 410 or geofence 412. For example, the aircraft 101 may be mid-flight in any of various phases of flight. The ability to reduce the mode during flight may be advantageous for ensuring safety of the aircraft 101. By way of another example, the aircraft 101 may be in on the ground, such as at a gate or during taxi. Reducing the authority may be beneficial in preventing an unauthorized user from taking off while on the ground.

In a step 422, the aircraft may be in one of the full authority mode 402 or the reduced authority mode 404. The system 112 may detect a duress input. The system 112 may detect the duress input by any of the techniques described previously herein, such as, but not limited to, a facial detection, a duress phrase, a pin code, a button, a switch (e.g., a gated switch with a cover), and the like. In response to receiving the duress input, the processors may change the mode to the no authority mode 406. The user may then be prevented from controlling the flight control surfaces. For example, the aircraft may be in flight when a phrase is input and detected. The system 112 may recognize the input phrase and compare the input phrase with one or more duress phrases. In response to detection the input phrase as being a duress, the system 112 may lock out the controls, contact ground dispatch, and contact the air marshal. By way of another example, the aircraft may be on the ground and taxiing when the duress phrase is detected. The system 112 may recognize the duress phrase, lock out the controls, auto-taxi the aircraft back to the gate, and inform the ground dispatch.

In a step 424, the aircraft may be in one of the no authority mode 406 or the reduced authority mode 404. The system 112 may detect a duress input. The system 112 may detect the duress input by any of the techniques described previously herein, such as, but not limited to, biometric inputs, non-biometric inputs, speech recognition, nominal phrase, pin code, fingerprint, and the like. For example, the user may use speech recognition to input a phrase and compare the phrase with an unlock phrase to unlock the controls and change to full authority mode. The system may thus allow the user to change unlock the flight controls, even when in the no authority mode 406 or the reduced authority mode 404. At reduced and no authority states, if an authorized user on the flight deck has resolved, the authorized user thus has the ability to reclaim full authority by uttering a nominal phrase a code, or the like.

In embodiments, the processors receive an at-gate input. The at-gate input may indicate the aircraft is at a gate of an airport. The processors may receive the at-gate input from the pilot, the ground dispatch, or the like. In response to receiving, the at gate input, the processors may be configured to place the aircraft into the no authority mode. In this regard, the controls may be prevented from taxing or taking of the aircraft until the aircraft is placed into full authority mode by the authorized user. The pilot may leave the cockpit while at gate. Putting the aircraft into the no authority mode while at the gate may be beneficial in reducing vulnerabilities while the pilot is away from the flight deck. In further embodiments, the processors may be configured to receive an image from the camera, detect a face within the image, and determine the detected face is authorized. Such determination may indicate the authorized user is disposed within the flight deck (e.g., determine the pilot has returned to the flight deck). In response to determining the detected face within the image is authorized, the processors may change the mode of the aircraft from the no authority mode to the full authority mode.

In embodiments, the system 112 requires one or more of a biometric and/or a nonbiometric authentication before unlocking the controls. For example, the system 112 may require at least two forms of biometric authentication and at least one form of nonbiometric authentication prior to allowing access to flight control, although this is not intended to be limiting.

In the event the authentication of the user fails, the user may be flagged as an unauthorized user. The system 112 may be configured to perform various function in the event of flagging the user, which may be based on the phase of the aircraft 101. For example, if the aircraft 101 is at the gate, the controls may be locked out and the alert may be provided to the dispatch. By way of another example, if the aircraft is in taxi and the authentication does not pass, the auto-taxi function may be engaged, the alert may be provided, and the controls may be locked-out. By way of another example, if the aircraft is in flight and the authentication does not pass, an alert may be provided to the air marshal and the emergency descent and landing system may be engaged.

Referring generally again to FIGS. 1A-4. In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system comprising:
   a camera configured to capture an image within a flight deck of an aircraft;
   a non-transitory memory maintaining program instructions and one or more authorized faces; and
   one or more processors configured to execute the program instructions maintained on the memory, the program instructions causing the one or more processors to:
   receive the image from the camera;
   determine a detected face within the image is unauthorized, thereby indicating an unauthorized user is disposed within the flight deck; wherein the one or more processors detects the detected face by a facial detection algorithm; wherein the one or more processors determines the detected face within the image is unauthorized by comparing the detected face with the one or more authorized faces; and
   change a mode of the aircraft from a full authority mode to a reduced authority mode in response to determining the detected face within the image is unauthorized; wherein the unauthorized user has full authority to control one or more user interface elements of the aircraft in the full authority mode; wherein the unauthorized user has reduced authority to control the one or more user interface elements of the aircraft in the reduced authority mode.

2. The system of claim 1, wherein a limit is placed on a rate-of-climb, a rate-of-descent, a pitch angle, a roll angle, a yaw angle, and a thrust in the reduced authority mode.

3. The system of claim 1, wherein the unauthorized user is prevented from moving the aircraft outside of a preset flight path in the reduced authority mode.

4. The system of claim 1, wherein the one or more processors are configured to receive an at-gate input, the at-gate input indicating the aircraft is disposed at a gate of an airport; wherein the one or more processors are configured to change the mode of the aircraft to a no authority mode in response to receiving the at-gate input.

5. The system of claim 4, wherein the one or more processors are further configured to receive a second image from the camera and determine a second detected face within the second image is authorized, thereby indicating an authorized user is disposed within the flight deck; wherein the one or more processors are further configured to change the mode of the aircraft from the no authority mode to the full authority mode in response to determining the detected face within the image is authorized.

6. The system of claim 1, further comprising at least one input device; wherein the one or more processors are further configured to receive an input from the at least one input device; wherein the one or more processors are further configured to change the mode of the aircraft from the reduced authority mode to the full authority mode in response to the input.

7. The system of claim 6, wherein the at least one input device includes a microphone; wherein the input includes a phrase which matches an unlock phrase stored in the memory.

8. The system of claim 6, wherein the at least one input device includes a non-biometric input device including at least one of a badge reader or a touchscreen display; wherein the input includes at least one of a badge number, a password, or a pin code which matches an authorized badge number, an authorized password, or an authorized pin code stored in the memory.

9. The system of claim 6, wherein the at least one input device includes a biometric input device including at least one of a camera, a microphone, or a fingerprint scanner; wherein the input includes a biometric input including at least one of a face, a voice, a fingerprint associated with an authorized user stored in the memory.

10. The system of claim 4, wherein the one or more processors require at least two biometric inputs and at least one non-biometric inputs which are associated with an authorized user before changing the mode of the aircraft from the reduced authority mode to the full authority mode.

11. The system of claim 1, further comprising at least one input device; wherein the one or more processors are further configured to receive an input from the at least one input device; wherein the one or more processors are further configured to change the mode of the aircraft from the reduced authority mode to a no authority mode in response to the input.

12. The system of claim 11, wherein the at least one input device includes a microphone; wherein the at least one input includes a phrase which matches a duress phrase stored in the memory.

13. The system of claim 11, wherein the one or more processors are further configured to at least one of contact a ground dispatch or an air marshal in response to the input.

14. The system of claim 11, wherein one or more flight control systems of the aircraft are disengaged in the no authority mode to lock out and prevent the unauthorized user from controlling the aircraft.

15. The system of claim 14, wherein an emergency descent and landing system is engaged in the no authority mode.

16. The system of claim 11, wherein the at least one input device includes at least one of a button, a switch, or a touchscreen.

17. The system of claim 11, wherein the one or more processors are further configured engage one or more functions based on a current state of the aircraft; wherein the current state of the aircraft includes in-taxi; wherein the one or more processors are further configured to engage an auto-taxi function causing the aircraft to automatically taxi back to a gate in response to the input.

18. The system of claim 11, wherein the one or more processors are configured to receive a second input from the at least one input device; wherein the one or more processors are further configured to change the mode of the aircraft from the no authority mode to the full authority mode in response to the input.

19. A method comprising:
receiving an image from a camera, wherein the camera captures the image within a flight deck of an aircraft;
determining, by one or more processors, a detected face within the image is unauthorized, thereby indicating an unauthorized user is disposed within the flight deck; wherein the one or more processors detects the detected face by a facial detection algorithm; wherein the one or more processors determines the detected face within the image is unauthorized by comparing the detected face with one or more authorized faces maintained in a non-transitory memory; and
changing a mode of the aircraft from a full authority mode to a reduced authority mode in response to determining the detected face within the image is un-authorized; wherein the unauthorized user has full authority to control one or more user interface elements of the aircraft in the full authority mode; wherein the unauthorized user has reduced authority to control the one or more user interface elements of the aircraft in the reduced authority mode.

20. The method of claim 19, further comprising changing the mode of the aircraft from the reduced authority mode to a no authority mode in response to receiving a duress input.

* * * * *